UNITED STATES PATENT OFFICE.

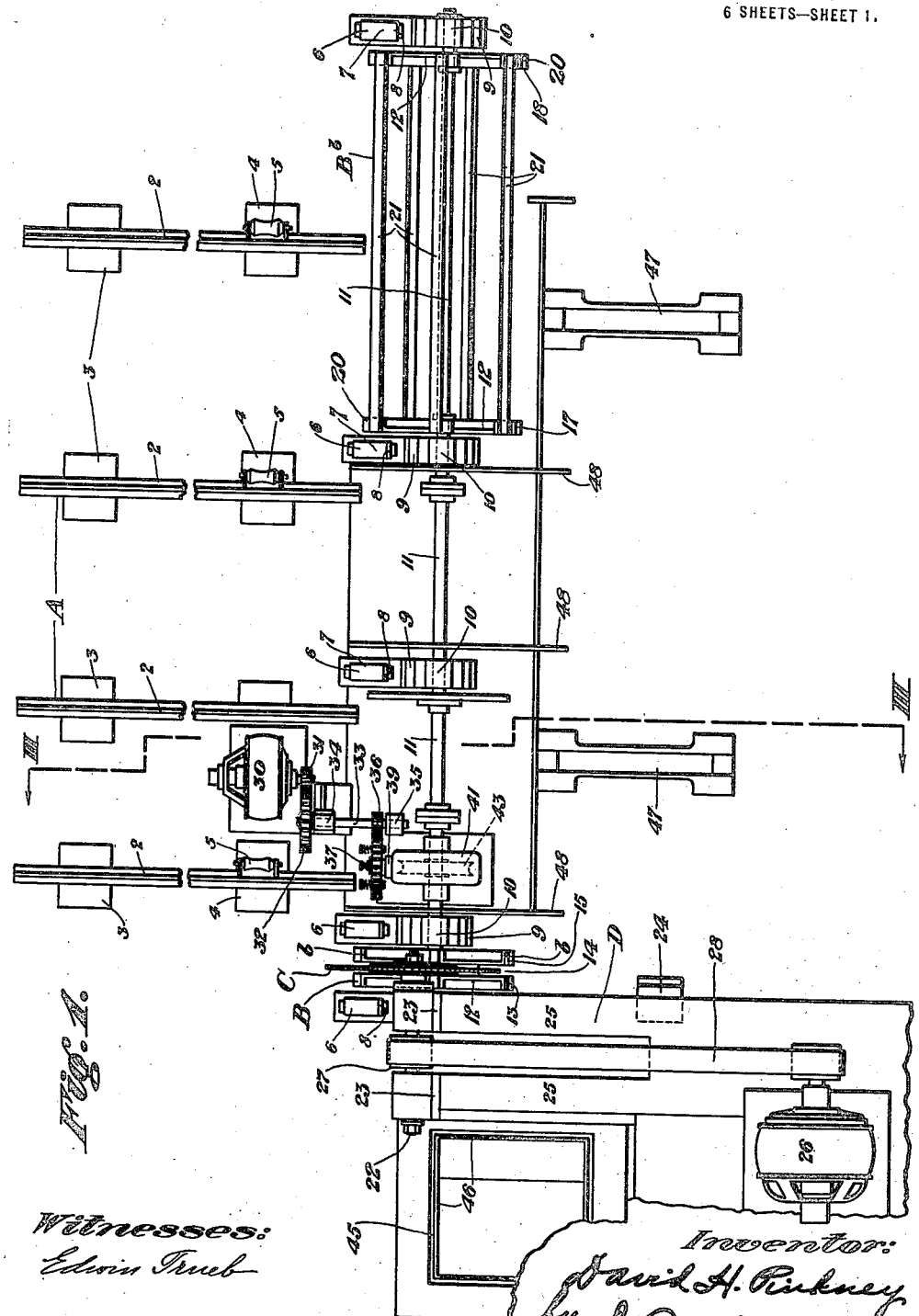

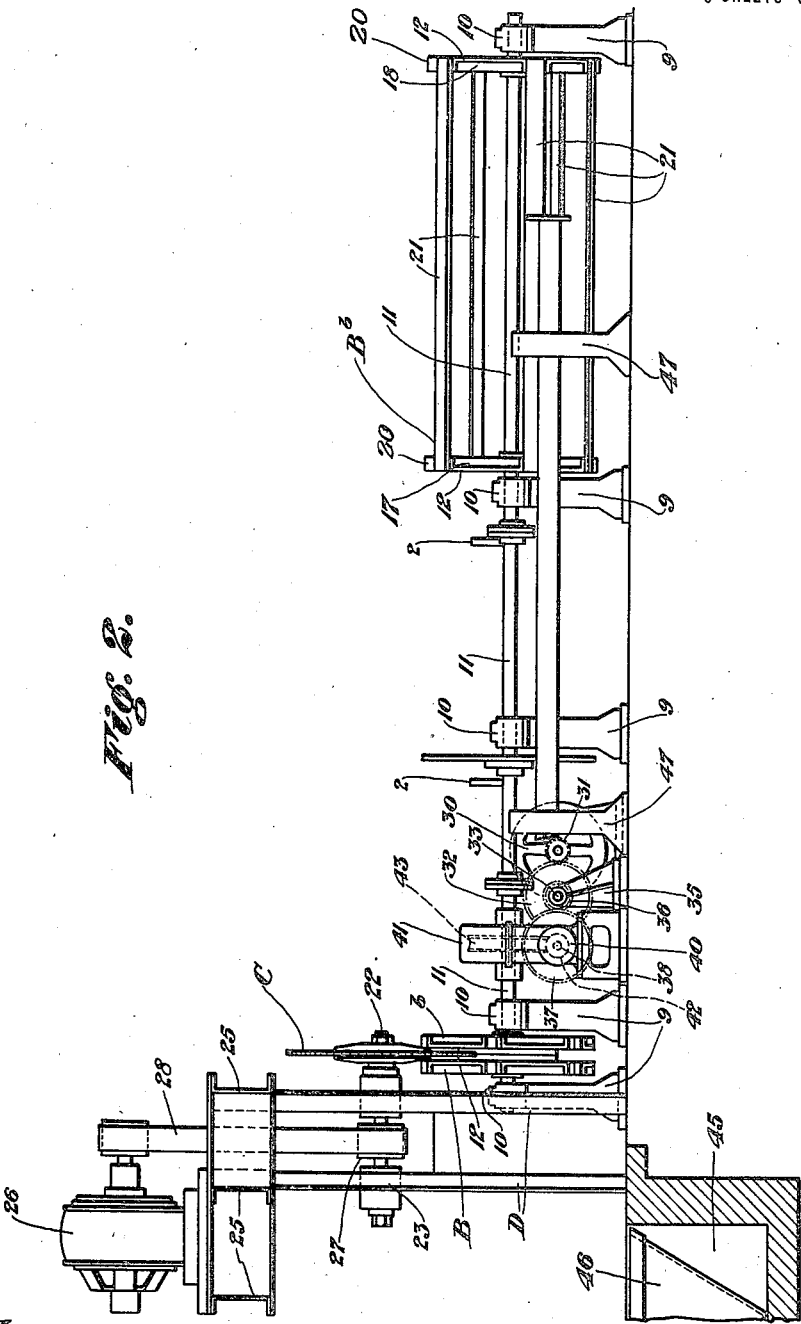

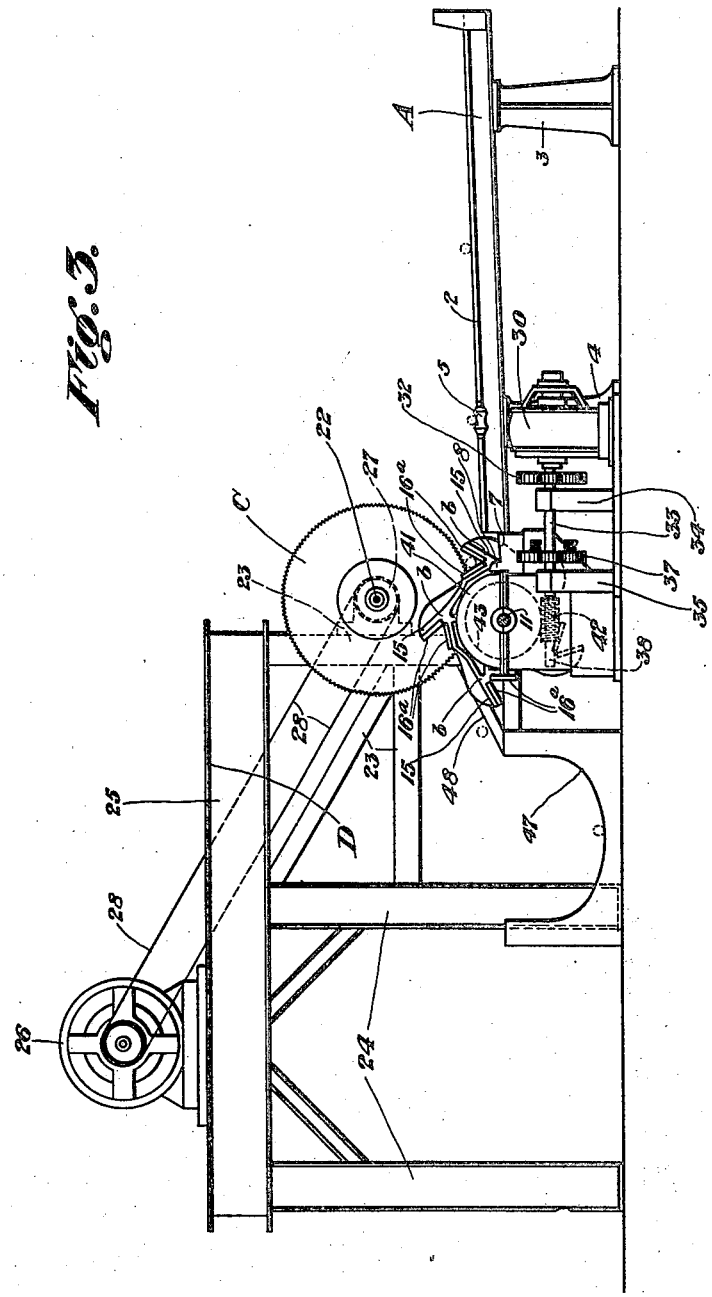

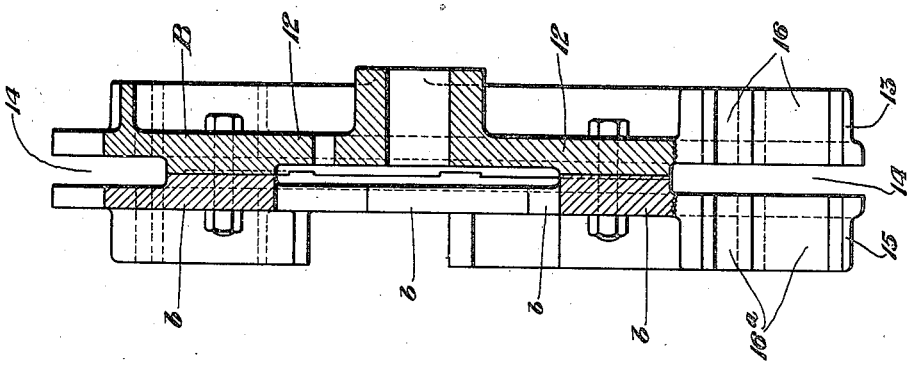
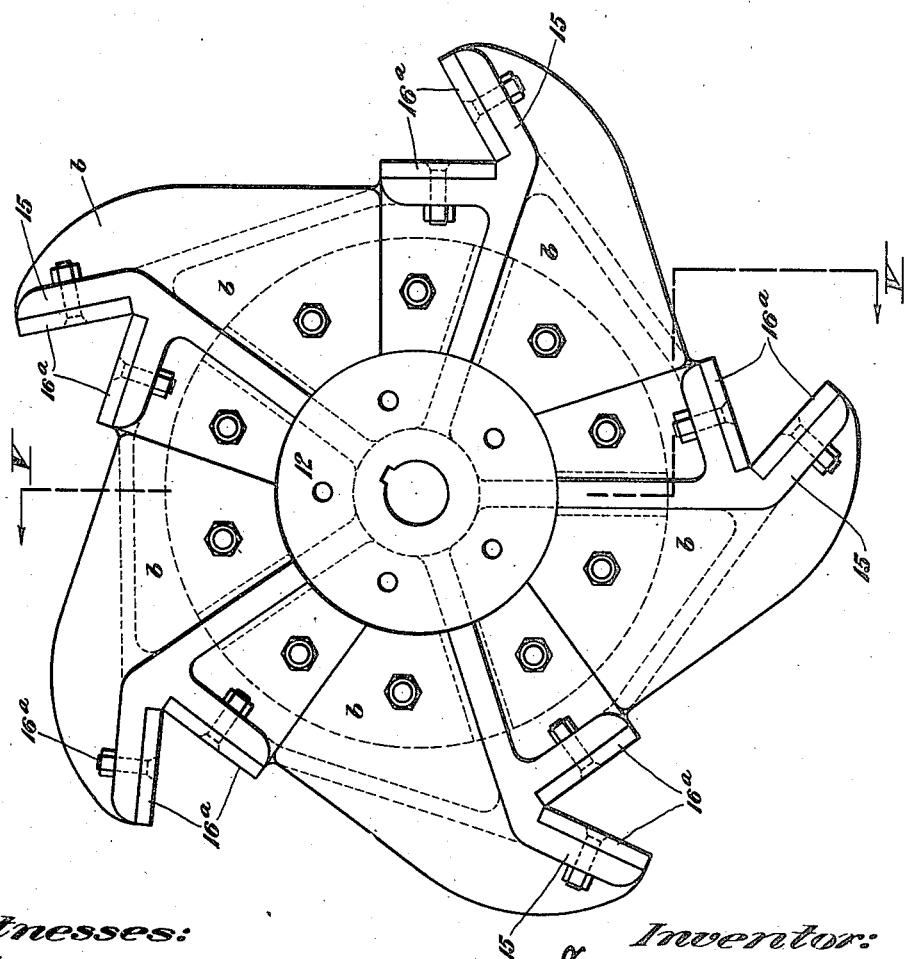

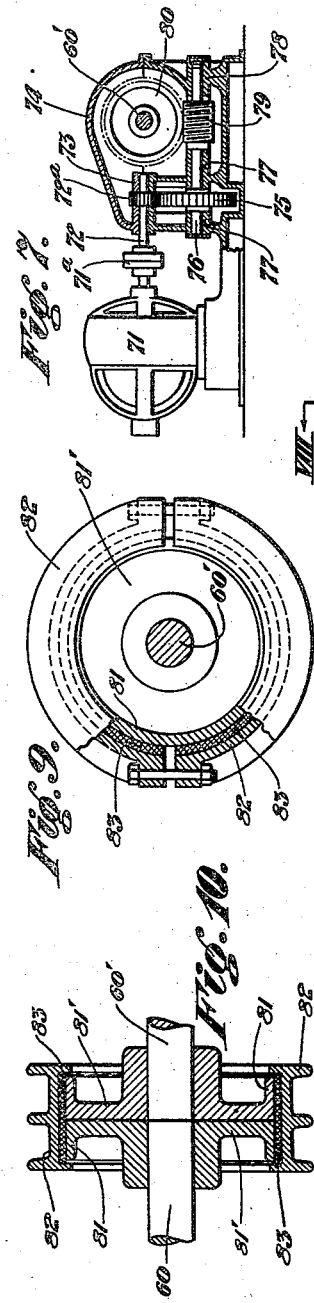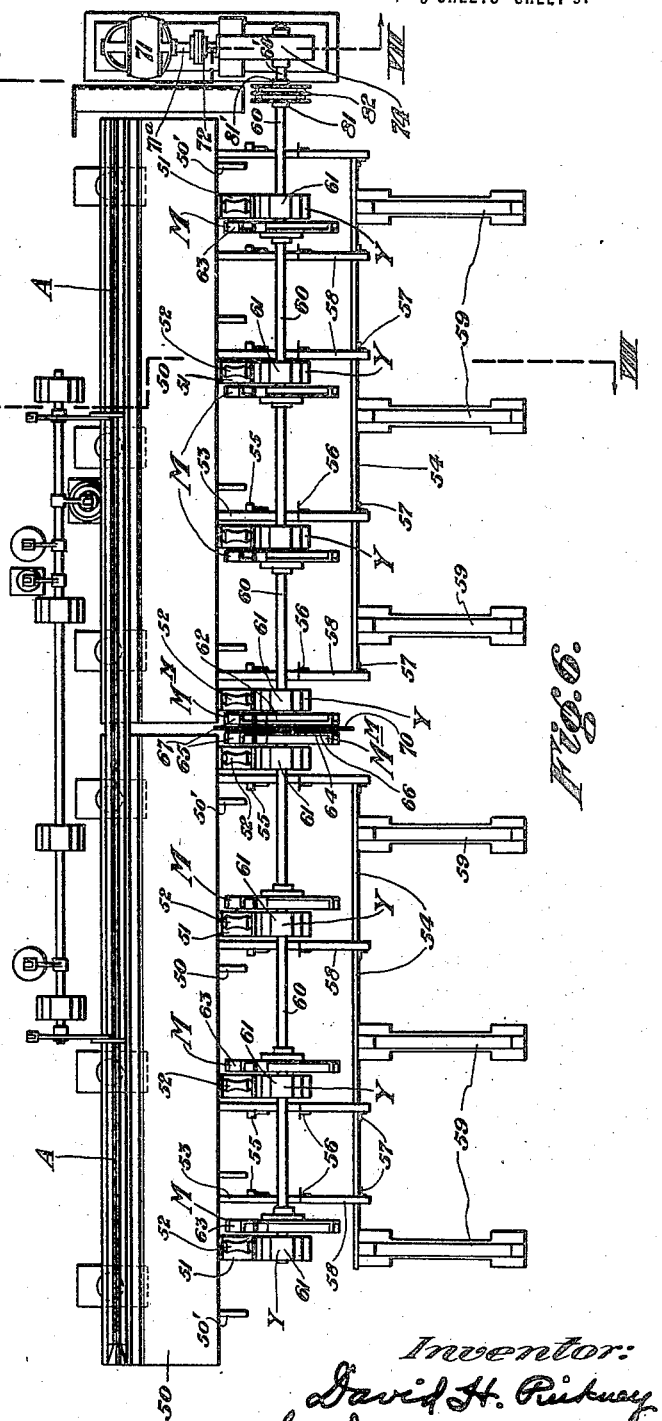

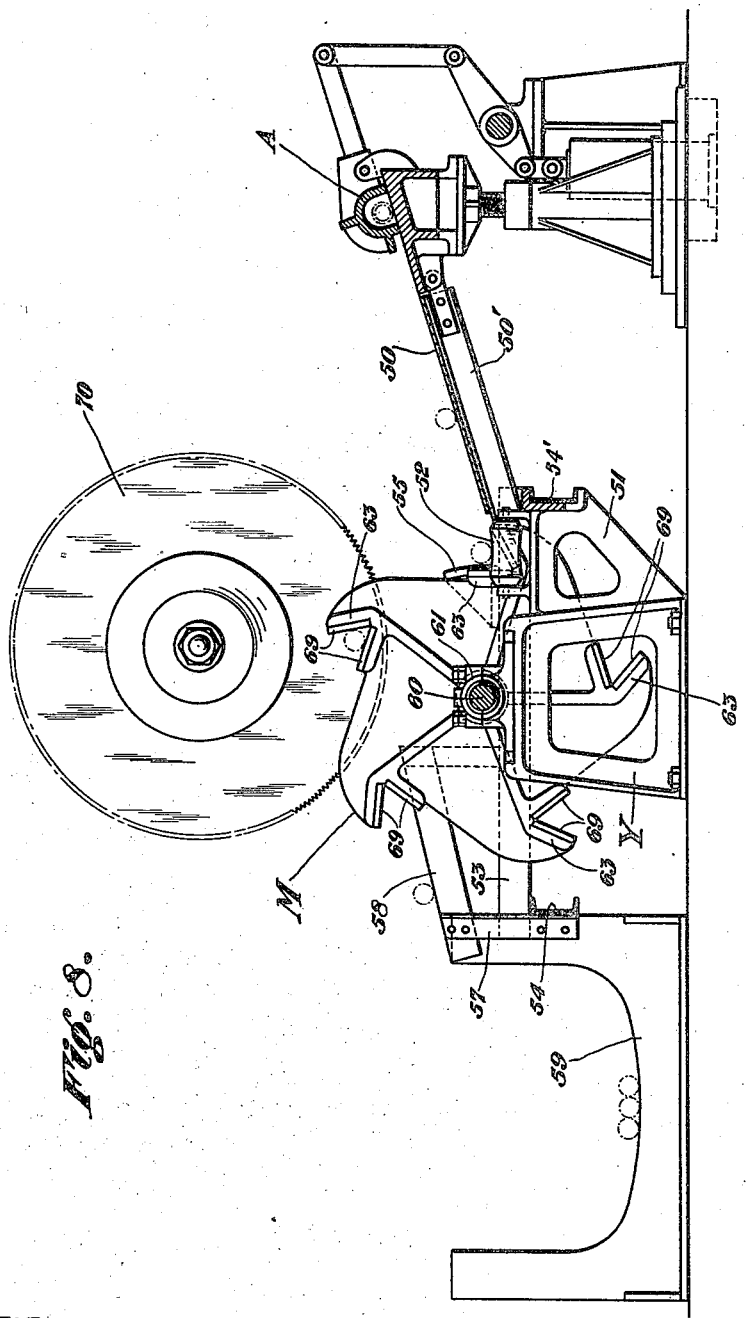

DAVID H. PINKNEY, OF ELYRIA, OHIO, ASSIGNOR TO NATIONAL TUBE COMPANY, OF PITTSBURGH, PENNSYLVANIA, A CORPORATION OF NEW JERSEY.

PIPE-SAWING APPARATUS.

1,407,439.     Specification of Letters Patent.     Patented Feb. 21, 1922.

Application filed January 15, 1921. Serial No. 437,394.

*To all whom it may concern:*

Be it known that I, DAVID H. PINKNEY, a citizen of the United States, and resident of Elyria, in the county of Lorain and State of Ohio, have invented certain new and useful Improvements in Pipe-Sawing Apparatus, of which the following is a specification.

My invention relates to apparatus for sawing pipes, tubes, and similar annular articles in cropping the ends and cutting such articles to length, and the invention further relates to improved means for handling and manipulating the pipes during the cutting operations.

The invention further relates to improvements in the construction and arrangement of the saw mandrel, saw, and saw operating mechanism.

The principal object of the invention is to provide pipe sawing apparatus having improved means by which the pipes are conveyed to, held against, and conveyed away from the saws.

Another object of my invention is to provide improved means for supporting the crop ends of the pipe as they are cut so as to cause a smoother cut end than heretofore.

A further object is to generally improve pipe sawing apparatus, making them more efficient and durable than those heretofore constructed.

These and various other objects and advantages will be brought out in the following specification and illustrated in the accompanying drawings, in which—

Figure 1 is a top plan view of an apparatus for sawing tubes constructed in accordance with my invention.

Figure 2 is a rear elevation thereof.

Figure 3 is a sectional side elevation taken on the line III—III of Figure 1.

Figure 4 is an enlarged side elevation of one of the saw turrets.

Figure 5 is a cross section through the turret of Figure 4 on the line V—V.

Figure 6 is a top plan view of a slightly modified construction of apparatus constructed in accordance with my invention.

Figure 7 is a detail sectional view on the line VII—VII of Figure 6, showing the motor drive for the turrets of the modified construction.

Figure 8 is an enlarged cross sectional elevation of the apparatus of Figure 6 on the line VIII—VIII.

Figures 9 and 10 are detail views of the friction or slip coupling connecting the driving motor and its gearing to the turret shaft.

Referring more particularly to Figures 1 to 5 of the drawings, the letter A designates the feed table as a whole, which is slightly inclined toward the saw C, and comprises a plurality of rails 2 supported on stands 3 and 4. The stands 4 are nearest the saws and support rollers 5, which extend parallel with, and slightly above the rails 2 to provide for free transverse movement of the pipe so that they may be readily positioned for cropping the ends.

Centering blocks 6 are mounted at the saw end of the rails 2, and are spaced below the upper face of the rails, and extend a considerable distance therebeyond, into the line of travel of turret members B and B$^b$ to be described.

The blocks 6 have downwardly inclined upper faces 7 and upwardly projecting forward ends 8 forming stops.

Located forward from the table A, and below the saw C are a plurality of bearing blocks 9, having bearings 10 on their upper faces adapted to receive and rotatably hold the sectional turret supporting shaft 11, having the turrets B and B$^b$ mounted thereon.

The turret B is the saw turret and comprises a disk member 12 arranged to the one side of the saw and has its periphery recessed, forming pipe conveying projections or fingers 13 adapted to engage and pick up the pipe from the centering blocks 6 and carry it up and against the saw.

The turret B is provided with sectors $b$ which are bolted to the saw side of the turret disk 12, and are offset along their length to provide a clearance 14 between the disk and the sectors for the saw blade.

Each of the sectors $b$ is recessed, forming a pipe conveying and supporting projection or finger 15 on a line with the projection 13 in the disk 12. The projections or fingers 13 in the disk, and the projections or fingers 15 in the sectors have wear plates 16 and 16$^a$, respectively, secured thereto, composed of hardened steel so that constant usage will not wear the sectors and disk, and cause imperfect alinement and support of the pipe.

The turret B$^b$ is mounted on the shaft 11, adjacent the end farthest from the saw, and comprises two disks 17 and 18 having their periphery recessed, forming supporting projections or fingers 20. Wear strips 21 having measuring gages indicated thereon, are secured to the faces of the projections and extend across from one disk to the other, thus providing for the cutting of various lengths of pipes to gage lengths.

The saw C is of the usual disk type and is mounted on the saw mandrel 22 journaled in a suitable supporting structure 23 mounted on motor support D, which comprises uprights 24 and cross beams or platform 25, on which the motor 26 is mounted. The motor 26 is adapted to drive the saw C and is connected to the pulley 27 on the mandrel 22 by a belt 28.

The shaft 11 is adapted to be rotated by a separate motor 30 having a pinion gear 31 in mesh with a gear 32 on a short shaft 33 journaled in bearings 34 and 35, and carrying a pinion 36, which meshes with a slip gear 37 on the shaft 38 journaled in bearings 39 and 40 formed in the lower end of a worm wheel housing 41. The shaft 38 carries a worm 42 which meshes with worm wheel 43 mounted on shaft 11 and enclosed within the housing 41.

A pit 45 is formed at the end of the apparatus nearest the saw and is adapted to hold a bucket 46 to receive the crop ends of the pipe as they are cut.

Suitable cradles 47 are mounted along the discharge side of the apparatus to receive the cut pipe, and downwardly inclined skids 48 are arranged between the apparatus proper and the cradles, forming a bridge adapted to receive the pipes from the turrets B and B$^b$ and convey to the cradles by gravity.

The operation of the apparatus described above is as follows—The pipe to be cut is placed on the table A, and rolled toward the saws C. As the pipes are passed onto the rollers 5, they are moved transversely or endwise in order to bring the point desired to be cut, in line with the saw C. After the pipes are in position, they are moved from the rollers 5 and along the table until they drop onto the centering blocks 6, which hold them in proper position and alinement in the path of the turrets B and B$^b$. As the turrets B and B$^b$ rotate, their respective pipe supporting projections will engage and lift the pipe from the blocks 6, carrying it upward and forward against the revolving saw C. At this point the strain or tension caused by forcing the pipe against the saw will tend to hold back or retard the movement of the turrets, and this retarded movement will be taken up by the slip gear 37, which is one of the train of gears driving the shaft 11.

After the pipe is cut, the crop end will drop into pit 45 and the pipe length will be carried forward and dropped onto the skids 48 and roll by gravity into the cradles 47.

In Figures 6, 7 and 8 inclusive, I have shown my invention embodied in a hot saw 70 for cutting hot pipes to length. In this construction, the pipe is taken direct from the dump trough A, and is conveyed by gravity over downwardly inclined skid plates 50, supported on girder supports 50' to my improved sawing apparatus.

The sawing apparatus comprises a plurality of base stands Y spaced apart, and having a bracket-like projection 51 on the side nearest the dump trough.

A centering roller 52 is journaled in suitable bearings formed on the upper face of each of the projections 51, so that if desired the pipes to be sawed may be readily moved transversely or endwise.

A rectangular frame is mounted on the stands Y, and comprises cross pieces 53, and parallel side members 54, 54'.

The side member 54' nearest the dump trough, supports the lower ends of the girders which support the skid plates 50, and the cross pieces 53 have stop members 55 secured thereto adapted to stop the pipe in a central position on the rollers 52.

Upright supports 56 are secured on the cross pieces 53 intermediate their ends, and other upright supports 57 are secured to both the forward side members 54 and the cross pieces, the last named uprights being of less height than the first, and both of such uprights being joined by downwardly inclined skids 58, adapted to receive the pipe after it has been cut, and convey it by gravity to suitable cradles 59 secured to the forward side member 54.

A plurality of turrets M and a central saw turret M$^m$ are mounted on a turret shaft 60 journaled in suitable bearings 61 formed on the upper face of the stands Y. The turrets M comprise a disk member pinned or otherwise secured to the shaft 60, and having its periphery cut away, forming pipe supporting projections or fingers 63. The turret M$^m$ is the saw turret and comprises a disk member 64 pinned or otherwise secured to the shaft 60, and having its periphery recessed, forming pipe supporting projections or fingers 65 adapted to engage the pipe to be cut.

A plurality of sectors 62, corresponding to the number of projections or fingers 65, are bolted or otherwise secured to the one side of the disk 64 and are offset along their length to provide a clearance 66 between the disk and the sectors for the saw blade. Each of the sectors are recessed, forming a pipe supporting projection or finger 67.

The projections or fingers 65 and 67 in the turret M$^m$, and the projections 63 in the turrets M, all have wear plates 69 secured thereto to prevent damaging the projections from constant use.

A suitable saw 70 shown diagrammatically in the drawings, will be mounted in any desired manner above the saw turret, and its blade extends into the clearance space 66 between the sectors and the disk to cut the pipe.

The turrets M and M^m are of such shape and size that their pipe supporting projections extend under the pipe when it is centered on the rollers 52 and they are adapted to engage and lift the pipe from the rollers carrying it up, forward and against the saw and then forward, discharging it onto the skids 58 which will convey it to the collecting cradles.

The turret shaft 60 is rotated by a motor 71 having its armature shaft coupled by a coupling 71^a direct to a stub shaft 72, journaled in bearings 73, formed in a housing 74 and having a pinion gear 72^a thereon, in mesh with a gear 75 on worm shaft 76, journaled in bearings 77 and 78 in the housing 74. The shaft 76 has a worm 79 thereon in mesh with worm wheel 80 mounted on a shaft 60', and enclosed in the housing 74. The shaft 60' is coupled to the shaft 60 by slip coupling member comprising a half coupling 81' secured to the shaft 60', a second half coupling 81 secured to turret shaft 60, and a slip coupling or split ring 82 surrounding the half couplings 81 and 81', and having a friction or brake lining 83 secured to its inner circumferential surface and engaging the outer circumferential surface of the half couplings 81 and 82, thereby binding the half coupling members 81 and 81' together so as to rotate shaft 60 and the turrets. However, as the pipes on the turrets engage the saw 70 the movement of the turrets and shaft 60 will be retarded, and the half coupling 81 secured to the turret shaft 60 will slip with relation to the other half coupling 81', thereby preventing a strain at this point.

The operation of the above described apparatus is as follows—the pipes are discharged singly from the dump trough A onto the skid plates 50 and roll or slide by gravity over the plates and onto the rollers 52 and against the stops 55. The operator may then readily move the pipes transversely or endwise, bringing them in proper position for cutting. After the pipes have been positioned, they will be picked or lifted from the rollers 55 by the projections of the turrets M and M^m and carried up, forward, and held against the saw where they will be cut and then carried by the turrets forward and down, and discharged onto the downwardly inclined skids 58. The pipes will then roll or slide by gravity along the skids 58 and fall into the receiving cradles 59.

While I have described in detail the two forms of apparatus shown in the drawings, as embodying my invention, it will be expressly understood that these forms are only illustrative and that various changes may be made in form, number, and combination of parts without departing from the spirit of my invention as defined in the following claims.

I claim:—

1. In a pipe sawing machine, a conveying turret adapted to carry the pipe up, against, and away from the saw, said turret comprising a disk member having a plurality of rigid pipe carrying fingers spaced around its periphery, a sector secured to the one side of said disk adjacent each of said fingers, said sectors being cut away forming a projecting finger in line with said first named fingers, and said sector fingers being offset in their length so as to provide a space between said fingers on said disk and said sectors for the passage of a saw.

2. In a pipe sawing machine, the combination with a saw, of a plurality of conveying turrets adapted to carry the pipe up, against, and away from the saw, some of said turrets comprising a disk member having a plurality of rigid pipe carrying fingers spaced around its periphery, and at least one of said turrets comprising a disk having a plurality of rigid fingers spaced around its periphery, a sector secured to the one side face of said disk adjacent each of said peripheral fingers, said sectors being cut away forming a projecting finger in line with said peripheral fingers, and said sector fingers being offset in their length so as to provide a passageway between said peripheral fingers and said sectors for said saw.

3. The combination with a pipe sawing machine comprising a feed table having centering rollers thereon, and a disk saw arranged above said table, of a plurality of conveying turrets adapted to carry the pipe up, against, and away from said saw, at least one of said turrets comprising a disk having a plurality of rigid fingers spaced around its periphery, a sector secured to the one side face of said disk adjacent each of said peripheral fingers, said sectors being cut away forming a projecting finger in line with said peripheral fingers, and said sector fingers being offset in their length so as to provide a passage-way between said peripheral fingers and said sectors for said saw, the others of said turrets comprising a disk member having a plurality of rigid integral fingers spaced around its periphery, said last named turrets being connected by gage strips of relatively hard metal secured across the fingers of the several turrets forming a cage-like structure.

4. The combination with a pipe sawing machine comprising a feed table having centering rollers thereon, and a disk saw arranged above said table, of a plurality of conveying turrets adapted to carry the pipe up, against, and away from said saw, at least one of said turrets comprising a disk having a plurality of rigid fingers spaced around its periphery, a sector secured to the one side face of said disk adjacent each of said peripheral fingers, said sectors being cut away forming a projecting finger in line with said peripheral finger, and said sector fingers being offset in their length so as to provide a passage-way between said peripheral fingers and said sectors for said saw, the others of said turrets comprising a disk member having a plurality of rigid integral fingers spaced around its periphery, all of said turrets having wear plates of a relatively hard metal secured to the faces of said fingers.

5. The combination with a pipe sawing machine comprising a feed table having a plurality of rollers journaled thereon to facilitate endwise movement of the pipe to be sawed, and a disk saw journaled in a rigid frame above said table, of a plurality of conveying turrets adapted to carry the pipe up against, and away from said saw, at least one of said turrets comprising a disk having a plurality of rigid fingers spaced around its periphery, a sector secured to the one side face of said disk adjacent each of said peripheral fingers, said sectors being cut away forming a projecting finger in line with said peripheral fingers and said sector fingers, and being offset in their length to provide a passage-way between said peripheral fingers and said sectors for said saw, the other of said turrets comprising a disk member having a plurality of rigid integral fingers spaced around its periphery, all of said turrets having wear plates of relatively hard metal secured to the faces of their respective fingers.

In testimony whereof, I have hereunto set my hand.

DAVID H. PINKNEY.